United States Patent
Shotey et al.

(10) Patent No.: US 8,631,544 B1
(45) Date of Patent: Jan. 21, 2014

(54) CABLE CLAMP STRAP

(75) Inventors: Marcus J. Shotey, Scottsdale, AZ (US);
Jeffrey P. Baldwin, Phoenix, AZ (US);
Richard L. Cleghorn, Tempe, AZ (US);
Iven Dieterle, Tempe, AZ (US);
Nathaniel A. Falendysz, Phoenix, AZ (US)

(73) Assignee: Hubbell Incorporated, Shelton, CT (US)

( * ) Notice: Subject to any disclaimer, the term of this patent is extended or adjusted under 35 U.S.C. 154(b) by 333 days.

(21) Appl. No.: 13/008,444

(22) Filed: Jan. 18, 2011

Related U.S. Application Data

(60) Provisional application No. 61/295,584, filed on Jan. 15, 2010.

(51) Int. Cl.
*F16B 2/10* (2006.01)

(52) U.S. Cl.
USPC ............................... 24/513; 24/19; 24/132 R

(58) Field of Classification Search
USPC ........... 294/165; 70/16; 24/16 R, 17 A, 17 R, 24/20 TT, 115 R, 132 R, 132 WL, 11 M, 24/11 P, 19, 24, 59, 66.8, 66.7, 68 A, 24/132 AA, 170, 173, 178, 188, 191, 489, 24/506, 512, 513, 517, 532, 565, 568
See application file for complete search history.

(56) References Cited

U.S. PATENT DOCUMENTS

| | | | |
|---|---|---|---|
| 151,452 A | 5/1874 | Tower | |
| 200,950 A | 5/1878 | Tower | |
| 222,751 A | 12/1879 | Tower | |
| 470,869 A | 3/1892 | Kahlke | |
| 636,589 A | 11/1899 | Tower | |
| 686,626 A | 11/1901 | Maltby | |
| 732,417 A | 6/1903 | Judd | |
| 766,263 A | 8/1904 | Judd | |
| 772,468 A | 10/1904 | Maltby | |
| 827,385 A | 7/1906 | Olcott | |
| 870,871 A | 11/1907 | Eggleton | |
| 929,910 A | 8/1909 | Wood | |
| 948,310 A | 2/1910 | Caveney | |
| 985,560 A | 2/1911 | Widmayer | |
| 1,000,666 A | 8/1911 | Ceveney | |
| 1,014,118 A | 1/1912 | Carberry | |
| 1,038,492 A | 9/1912 | Lorey | |
| 1,625,729 A * | 4/1927 | Krum | 24/132 R |
| 2,607,094 A * | 8/1952 | Nicosia | 403/274 |
| 2,705,354 A * | 4/1955 | Parsons | 24/132 R |
| 3,146,614 A | 9/1964 | Von Frantzius | |
| 3,310,852 A | 3/1967 | Flanders | |
| 3,429,985 A | 2/1969 | Czigler | |
| 3,530,543 A | 9/1970 | Desmarais et al. | |
| 3,546,750 A * | 12/1970 | Sheehan | 24/16 R |
| 3,574,900 A | 4/1971 | Emery | |
| 3,654,668 A | 4/1972 | Appleton | |
| 3,660,869 A | 5/1972 | Caveney et al. | |

(Continued)

*Primary Examiner* — Robert J Sandy
*Assistant Examiner* — Louis Mercado
(74) *Attorney, Agent, or Firm* — Marcus R. Mickney; Mark S. Bicks; Alfred N. Goodman

(57) ABSTRACT

A device for handling or storing one or more items including a first jaw having a ratcheting engagement member, a second jaw having a ratcheting engagement member, a pivot rotatably connecting the first jaw and the second jaw, a strap proximate the pivot, and wherein manipulating the strap imparts movement on the pivot.

20 Claims, 2 Drawing Sheets

(56) References Cited

U.S. PATENT DOCUMENTS

| | | |
|---|---|---|
| 3,910,280 A | 10/1975 | Talonn |
| 3,953,911 A | 5/1976 | Fishack |
| 4,123,095 A | 10/1978 | Stehlin |
| 4,278,042 A | 7/1981 | Lindquist |
| 4,340,998 A | 7/1982 | Liberge |
| 4,361,938 A | 12/1982 | Emery |
| 4,380,101 A | 4/1983 | Joubert et al. |
| 4,483,556 A | 11/1984 | Livolsi |
| 4,511,164 A | 4/1985 | Orchard |
| 4,650,925 A | 3/1987 | Coldren |
| 4,669,688 A | 6/1987 | Itoh et al. |
| 4,870,722 A | 10/1989 | Shell, Jr. |
| 4,956,897 A | 9/1990 | Speedle |
| 4,958,791 A | 9/1990 | Nakamura |
| 4,991,265 A | 2/1991 | Campbell et al. |
| 5,056,248 A | 10/1991 | Blanchard |
| 5,083,741 A | 1/1992 | Sancoff |
| 5,210,911 A | 5/1993 | Brown et al. |
| 5,228,174 A | 7/1993 | Beasley |
| 5,317,788 A | 6/1994 | Esposito et al. |
| 5,349,779 A | 9/1994 | Ben-Dror |
| 5,377,510 A | 1/1995 | Smith |
| 5,729,872 A | 3/1998 | Ginocchio |
| 5,794,461 A | 8/1998 | Smith |
| 6,101,684 A | 8/2000 | Ginocchio |
| 6,196,033 B1 | 3/2001 | Dowdle |
| 6,742,223 B1 | 6/2004 | Chang |
| D608,191 S * | 1/2010 | Radle et al. .................. D8/396 |
| D609,998 S * | 2/2010 | Radle et al. .................. D8/396 |
| 7,900,324 B2 * | 3/2011 | Ginocchio .................. 24/272 |
| 8,246,095 B2 * | 8/2012 | Radle et al. .................. 294/165 |
| 8,328,458 B2 * | 12/2012 | Werth .................. 403/289 |
| 2009/0211063 A1 * | 8/2009 | Ginocchio .................. 24/270 |
| 2011/0131769 A1 * | 6/2011 | Ginocchio .................. 24/16 R |

* cited by examiner

CABLE CLAMP STRAP

CROSS-REFERENCE TO RELATED APPLICATIONS

This application claims the benefit of the filing date of U.S. Provisional Patent Application 61/295,584, to Shotey et al. entitled "Cable Clamp strap" which was filed on Jan. 15, 2010, the disclosure of which is hereby incorporated herein by reference.

BACKGROUND

Cable holders and devices for bundling or storing items are well known. Traditional cable holders include a hand-cuff like element with jaws that are self-sustained in an open position while an item is bundled within the jaws. While jaws self-sustained in the open position ensure that the item can be located within the jaws, the user is required to manipulate the item and the jaws to encircle the item, thereby requiring a great deal of dexterity.

There are multiple variations of cable holders and devices known in the art including designs that use two separate jaws rotatably mounted together or a single piece unit that can flex to encircle the item. Nevertheless, cable holders require an inordinate amount of control to accomplish the goal of containing the item.

SUMMARY

This disclosure includes one or more device holder designs that permit the user to easily collect and store a variety of articles. A particular implementation employs a pair of jaws with a strap arranged to close the jaws during operation.

In one aspect, a device for handling or storing one or more items including a first jaw having a ratcheting engagement member, a second jaw having a ratcheting engagement member, a pivot rotatably connecting the first jaw and the second jaw, a strap proximate the pivot, and wherein manipulating the strap imparts movement on the pivot.

Particular implementations may comprise one or more of the following features. Linear manipulation of the strap may impart pivotal movement at the pivot. Manipulating the strap may decrease a distance between the first jaw and the second jaw. The first jaw and the second jaw may each further include an inner surface defining an opening. The opening may be decreased in size by pulling the strap in a first direction. The opening may remain the same size by pushing the strap in a second direction opposite the first direction. The first jaw and the second jaw may be movable relative to one another without manipulating the strap. The first jaw and the second jaw may be movable relative to one another while compressing a release. The first and second jaws may be movable relative to one another in a first direction without compressing a release button and are movable relative to one another in a second direction while compressing a release button.

The first jaw may nest at least partially within the second jaw. The strap supports the device for handling or storing one or more items. The first jaw ratcheting engagement member may include a plurality of teeth. The second jaw ratcheting engagement member may include a releasable tab. The releasable tab may permit rotational movement of the first jaw in a first direction and prevent rotational movement of the first jaw in a second direction opposite the first direction. The releasable tab may permit rotational movement of the first jaw in the second direction while compressing a release. The release tab may be biased in a locked position.

In another aspect, a device for handling or storing one or more items including a pair of generally rigid jaw members each having a hinge end an outer end, the jaw members including a mechanical latch to maintain the outer ends in an engaged position, each jaw member including an inner retaining surface and an outer press surface extending between the ends of the jaw member, the jaw members being connected together at their hinge ends, such that the jaw members have a plurality of second closed positions in which the outer ends are engaged and the inner retaining surfaces are in confronting relationship, and are self-aligned such that the outer ends automatically engage together upon applying pressure on the outer press surfaces, a strap communicating with the hinge ends, and wherein pulling the strap closes the jaw members.

In one implementation, pushing the strap does not rotate the jaw members.

In another aspect, a method of using a device for handling or storing one or more items, the device having a pair of generally rigid jaws, each jaw having a hinge end and an outer end with an inner retaining surface and an outer press surface extending between the ends of the jaw, the jaws being connected together at their ends, such that the device has a first open position, a plurality of second closed positions in which the outer ends are engaged and the inner retaining surfaces are in confronting relationship, and the jaws are self-aligned such that the outer ends automatically engage together upon pulling a strap extending from the hinge ends, the method including, placing the jaws of the device into an open position, passing the one or more items through a space defined between the outer ends in the open position of the device, and placing the device into one of the plurality of closed positions with the one or more items therein by pulling on the strap until the inner retaining surfaces surround the one or more items.

In one implementation, the method is adapted for handling or storing one or more items, including bundling the one or more items such that the width of the bundle is greater than the width of any one item in the bundle, and passing the bundled item through the space defined by the outer ends in the open position of the device.

BRIEF DESCRIPTION OF THE DRAWINGS

A more complete understanding of the present disclosure may be derived by referring to the detailed description when considered in connection with the following illustrative figures. In the figures, like reference numbers refer to like elements or acts through the figures.

DESCRIPTION

In the following description, and for the purposes of explanation, numerous specific details are set forth in order to provide a thorough understanding of the various aspects of the disclosure. It will be understood, however, by those skilled in the relevant arts, that the present applications may be practiced without these specific details. In other instances, known structures and devices are shown or discussed more generally in order to avoid obscuring the applications. In many cases, a description of the operation is sufficient to enable one to implement the various implementations and embodiments. It should be noted that there are many different and alternative configurations, devices and technologies to which the disclosed applications may be applied. The full scope of the disclosure is not limited to the examples that are described below.

Figure 1:
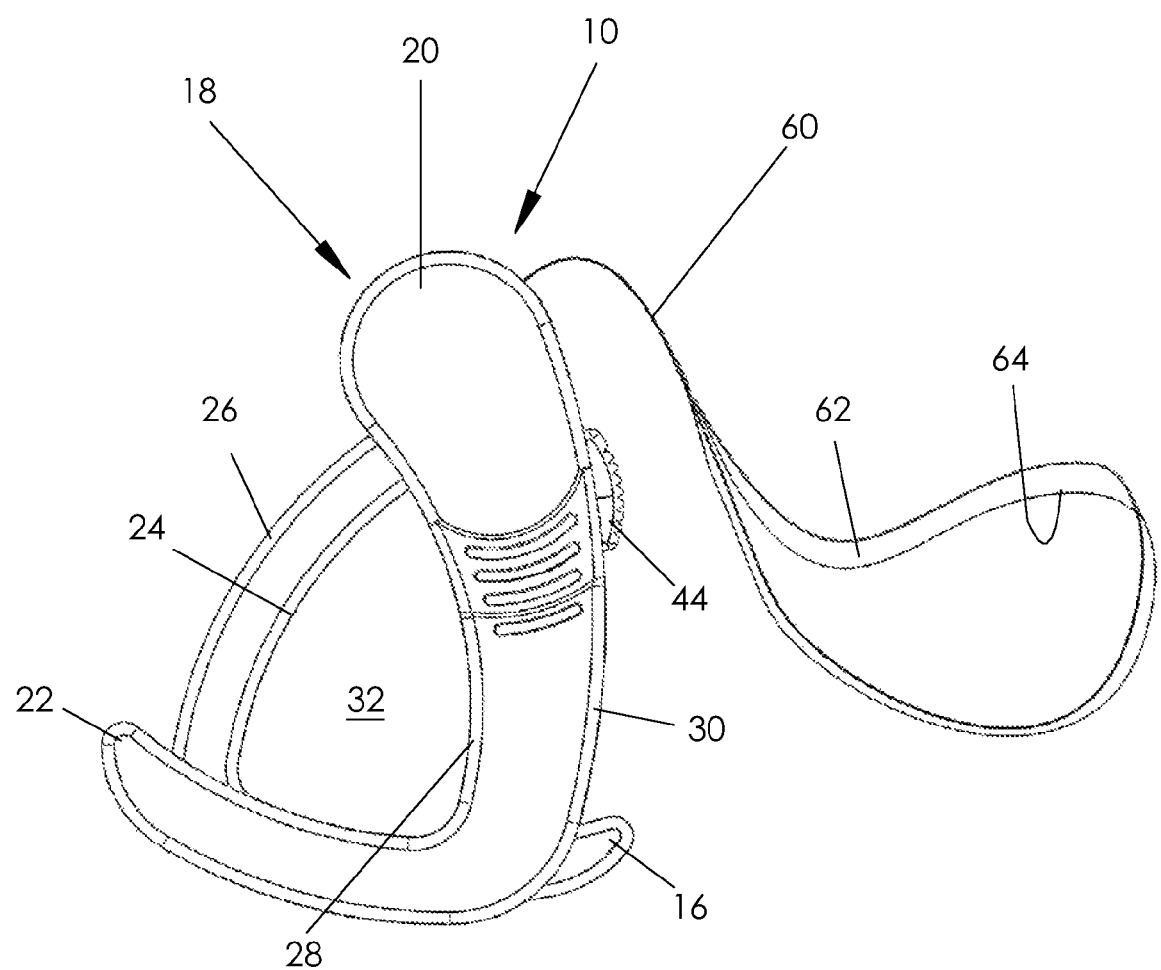
FIG. 1 is a front elevation view of a cable clamp with a strap in the fully closed position; and, FIG. 2 is a front elevation view of a cable clamp with a strap in the partially open position and half of the jaw removed to illustrate the inner workings of the cable clamp.
Figure 2:
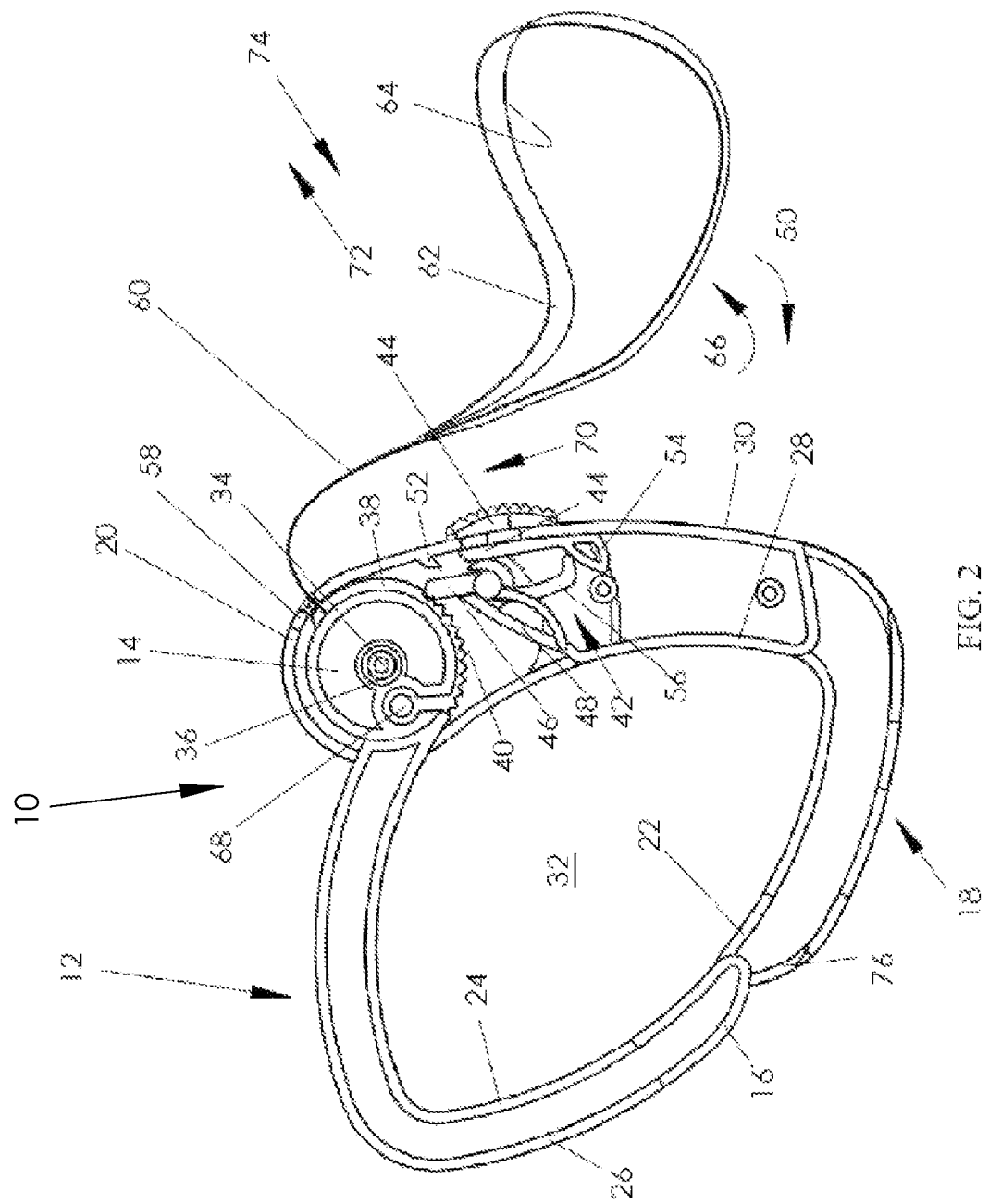

FIG. 1 illustrates an assembled right elevation view of cable clamp 10 in a fully closed position, while FIG. 2 illustrates a sectional view of cable clamp 10 in a first closed position. The cable clamp is rotatable from a fully open position (not shown) to a fully closed position (FIG. 1) in increments as the teeth (described below) permit.

Cable clamp 10 includes a first jaw 12 with a hinge end 14 and an outer end 16, while a second jaw 18 includes a hinge end 20 and an outer end 22. The first jaw also includes an inner surface 24 and an outer surface 26 which may be referred to as a pressing surface as the operation can press on the outer surface towards the inner surface to force the cable clamp in the closed direction. Similarly, second jaw 18 includes an inner surface 28 and an outer surface 30 which may also be referred to as a pressing surface and functions similar to the first jaw. In one aspect, inner surfaces 24 and 28 are direction toward one another and define a bundling opening 32 there between. Advantageously, the size of bundling opening 32 may be modified depending on the relative position of the first jaw 12 and second jaw 18. Thus, moving the first and second jaws away from each other increases the size of bundling opening 32, while moving the first and second jaws towards each other decreases the size of bundling opening 32.

First jaw 12 and second jaw 18 are both shown having essentially ninety degree bends near the midpoint between their respective hinge ends and outer ends. However, any suitable jaw shape may be utilized, including a continuous radius between the hinge end and the outer end. Further, first jaw 12 may be pivotally mounted within second jaw 18 and particularly hinge end 14 of the first jaw is rotationally mounted to hinge end 20 of the second jaw. In one aspect, second jaw hinge end 20 includes a pin 34 extending from one half of the second jaw and pin 34 may be located in the other half of the second jaw when the second jaw is fully assembled. A mounting hole 36 located in hinge end 14 of the first jaw is located on pin 34 and permits the first jaw to pivot on pin 34 and further helps to locate the first jaw between the two halves of the second jaw. Accordingly, during operation the first jaw outer end will continuously align with the second jaw outer end to ensure that the first and second jaws are properly mated.

Referring specifically to FIG. 2, hinge end 14 of first jaw 12 includes an outer surface 38 having a plurality of teeth or engagement members 40 thereon. Second jaw 18 also includes a release mechanism 42 with a release tab 44 operating a ratcheting engagement member 46. The release mechanism also includes a spring member 48 biasing engagement member 46 in a locking direction abutting teeth 40 to prevent relative rotation between the first and second jaws in a first direction 50. A stop 52 limits the travel of both release tab 44 and ratcheting engagement member 46, while release tab 44 includes a protrusion 54 which interacts with release arm 56 to generate rotation of engagement member 46 and permit the cable clamp to open.

Cable clamp 10 also includes an aperture 58 in the second jaw hinge end for a strap 60 to pass through. Strap 60 extends away from the cable clamp and forms a loop end 62 defining a hanging opening 64 arranged to permit a user to store the cable clamp, with or without a bundle secured within bundling opening 32. Advantageously, the cable clamp can easily and efficiently be stored in almost any location.

Referring again to FIG. 2, strap 60 is partially wound around hinge end 14 of first jaw 12, such that when the first jaw is rotated in the direction associated with arrow 66 (closed direction), strap 60 is pulled inward and wrapped further around hinge end 14 of first jaw 12. When first jaw 12 moves relative to second jaw 18 towards the open position, strap 60 is forced out of aperture 58 and effectively increases in length. Strap 60 is mounted to hinge end 14 of first jaw 12 at sleeve 68 and wraps within or around hinged end 14 in the direction associated with arrow 66.

Advantageously, strap 60 can also be pulled outward from second jaw 18 and rotate hinged end 14 of first jaw 12 in the direction associated with arrow 66. Further, pulling strap 60 also closes the cable clamp and reduces the size of bundling opening 32. Thus, the operation can merely pull strap 60 to close the cable clamp without having to push both the first and second jaw towards each other. Nevertheless, pushing strap 60 inwards does not release or open the first and second jaws because the release mechanism must be operated. Still further, if strap 60 is made from a nylon or other flexible material, then the strap will not have enough rigidity to rotate the first jaw.

Another advantageous use of strap 60 occurs during storage or carrying. As discussed above, manipulating strap 60 only permits the cable clamp to function in a closing direction and therefore increases the tension on the objects within bundling opening 32. Thus, during hanging, storing, or carrying at loop end 62 or hanging opening 64, the bundling opening 32 is constantly providing tension on the bundled object to securely hold the objects in place.

In operation, the user slides the release tab 44 of the release mechanism in the direction associated with arrow 70 until both the release tab 44 and engagement member 46 contact stop 52. At his point, the user can now manually separate the first and second jaw by pivoting the jaws away from each other while the release tab is engaged. Once the user releases the tab, the spring member forces the engagement member back into contact with teeth 40 to prevent the first and second jaws from opening. Nevertheless, teeth 40 and engagement member 46 are one-way biased, meaning that the jaws can move relative to one another in the closing direction while the teeth and engagement member are engaged, but cannot rotate relatively in the opposite direction while the teeth and engagement member are engaged.

In the implementations illustrated, both inner surfaces 24, 28 and outer surfaces 24, of the first and second jaws are both smooth finishes for appearance. This smooth finish can be accomplished because the teeth and engagement member arrangement is fully located at the hinge ends 14, 20 of the jaws. Nevertheless, it is within the spirit and scope of the disclosure to incorporate teeth on one or both of the inner and outer surfaces of either the first and second jaws. In this implementation, the other jaw may then include an engagement member located therein for securing the jaws.

While the operation of strap 60 has been described above, the movement of strap 60 is generally linear in one aspect as the strap leaves aperture 58. Specifically, when strap 60 is pulled in a linear manner away from aperture 58 in the direction associated with arrow 72, the jaws move toward one another relatively to close the jaws. Advantageously, the strap can be pulled in any direction, so long as the portion extending from the aperture is pulled out of, instead of into, the aperture, in order to accomplish closing the jaws. The one way operation of strap 60 is also accomplished because teeth 40 and engagement member 46 prevent the strap from forcing the first jaw to pivot in the open direction. In addition, strap 60 may be formed of a woven nylon or other generally flexible material, further preventing the strap from rotating the first and second jaws in the open direction.

In another aspect, the first jaw 12 may nest within the second jaw 18 during operation. Specifically, the second jaw may be formed of two halves which mate together during manufacturing. The second jaw outer end may include an opening 76 arranged to receive outer end 16 of the first jaw. Each half of the second jaw outer end partially forms opening 76 so that during operation, the first jaw rests between each half of the outer end of the second jaw. Alternatively, the first jaw may include a pair of halves defining a opening for receiving the second end of the second jaw without departing from the intended operation of the cable clamp. Still further, neither the first nor second jaw must nest within the corresponding jaw and may instead rest adjacent or proximate one another without departing from the spirit and scope of the disclosure, so long as the bundling opening is retained.

The user places the jaws into the open position by actuating the release mechanism and passes the one or more times through a spaced defined between the outer ends in the open position of the device. The user places the cable clamp into one of the plurality of closed positions with the one or more items therein by pulling on the strap until the inner surfaces 24, 28 surround the one or more items. In the alternative, the user may push on the outer surfaces (pressing surfaces) 26, 30 to place the cable clamp into any of the closed positions. The user may also wrap multiple layers of the one or more items such that the width of the bundle is greater than the width of any one time in the bundle, and passing the bundled item through the space defined by the outer ends in the open position of the cable clamp.

It will be understood that implementations are not limited to the specific components disclosed herein, as virtually any components consistent with the intended operation of a method and/or system implementation for a disclosed cable clamp may be utilized. Components may comprise any shape, size, style, type, model, version, class, grade, measurement, concentration, material, weight, quantity, and/or the like consistent with the intended operation of a method and/or system implementation.

The concepts disclosed herein are not limited to the specific implementations shown herein. For example, it is specifically contemplated that the components included in a particular implementation may be formed of any of many different types of materials or combinations that can readily be formed into shaped objects and that are consistent with their intended operation. For example, the components may be formed of: rubbers (synthetic and/or natural) and/or other like materials; polymers and/or like materials; plastics, and/or other like materials; composites and/or other like materials; metals and/or other like materials; alloys and/or other like materials; and/or any combination of the foregoing.

Furthermore, components of particular implementations may be manufactured separately and then assembled together or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations, it should be readily apparent that a number of modifications may be made without departing from the spirit thereof and that these implementations may be applied to other implementations. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

While the implementations have been particularly shown and described with reference to aspects thereof, it will be understood by those skilled in the art that various changes in form and details may be made therein without departing from the spirit and scope of the invention. Accordingly, unless otherwise specified, any components of the cable clamp according to the present disclosure indicated in the drawings or herein are given as an example of possible components and not as a limitation. Similarly, unless otherwise specified, any steps or sequence of steps of the usage according to the disclosure indicated herein are given as examples of possible steps or sequence of steps and not as limitations.

The invention claimed is:

1. A device for handling or storing one or more items, comprising:
   a first jaw having a first ratcheting engagement member;
   a second jaw having a second ratcheting engagement member engaging said first ratcheting engagement member;
   a pivot rotatably connecting the first jaw and the second jaw;
   a strap at least partially wrapped around the pivot such that manipulating the strap with respect to the pivot moves the pivot to rotate the first jaw with respect to the second jaw.

2. The device of claim 1 wherein linear manipulation of the strap imparts pivotal movement at the pivot.

3. The device of claim 1 wherein manipulating the strap decreases a distance between the first jaw and the second jaw.

4. The device of claim 1 wherein the first jaw and the second jaw each further comprise an inner surface defining an opening.

5. The device of claim 4 wherein the opening is decreased in size by pulling the strap in a first direction.

6. The device of claim 5 wherein a size of the opening remains the same when pushing the strap in a second direction opposite the first direction.

7. The device of claim 4 wherein the first and second jaws are movable relative to one another without manipulating the strap.

8. The device of claim 4 wherein the first and second jaws are movable relative to one another while compressing a release.

9. The device of claim 4 wherein the first and second jaws are movable relative to one another in a first direction without compressing a release button and are movable relative to one another in a second direction while compressing a release button.

10. The device of claim 1 wherein the first jaw nests at least partially within the second jaw.

11. The device of claim 1 wherein the strap supports the device for handling or storing one or more items.

12. The device of claim 1 wherein the first jaw ratcheting engagement member comprises a plurality of teeth.

13. The device of claim 1 wherein the second jaw ratcheting engagement member comprises a releasable tab.

14. The device of claim 13 wherein the releasable tab permits rotational movement of the first jaw in a first direction and prevents rotational movement of the first jaw in a second direction opposite the first direction.

15. The device of claim 14 wherein the releasable tab permits rotational movement of the first jaw in the second direction while compressing a release.

16. The device of claim 15 wherein the release tab is biased in a locked position.

17. A device for handling or storing one or more items, comprising:
   a pair of generally rigid jaw members each having a hinge end and an outer end, the jaw members comprising a mechanical latch to maintain the outer ends in an engaged position, each jaw member including an inner retaining surface and an outer press surface extending between the ends of the jaw member,
   the jaw members being connected together at their hinge ends, such that the jaw members have a plurality of second, closed positions in which the outer ends are engaged and the inner retaining surfaces are in confronting relationship, and are self-aligned such that the outer ends automatically engage together upon applying pressure on the outer press surfaces; and
   a strap being at least partially wrapped around the hinge end of a first jaw member of the jaw members and communicating with the hinge ends such that pulling the strap with respect to the hinge ends closes the jaw members.

18. The device of claim 17 wherein pushing the strap does not rotate the jaw members.

19. A method of using a device for handling or storing one or more items, the device having a pair of generally rigid jaws, each jaw having a hinge end and an outer end with an inner retaining surface and an outer press surface extending between the ends of the jaw, the jaws being connected together at their ends, such that the device has a first open position, a plurality of second closed positions in which the outer ends are engaged and the inner retaining surfaces are in confronting relationship, and the jaws are self-aligned such that the outer ends automatically engage together upon pulling a strap extending from the hinge ends, the method comprising:
   placing the jaws of the device into the open position;
   passing the one or more items through a space defined between the outer ends in the open position of the device; and,
   placing the device into one of the plurality of closed positions with the one or more items therein by pulling on the strap with respect to the hinge ends until the inner retaining surfaces surround the one or more items, the strap being at least partially wrapped around the hinge end of one of the jaws.

20. The method of claim 19 adapted for handling or storing one or more items, further comprising bundling the one or more items to form a bundle such that a width of the bundle is equal to or greater than a width of any one item in the bundle, and passing the bundle through the space defined by the outer ends in the open position of the device.

\* \* \* \* \*